(12) United States Patent
Gupta et al.

(10) Patent No.: US 9,591,061 B2
(45) Date of Patent: Mar. 7, 2017

(54) DOCUMENT WORKFLOW ARCHITECTURE

(75) Inventors: Ajay Gupta, Bangalore (IN); Geetha Manjunath, Bangalore (IN); Anjaneyulu Kuchibhotla, Bangalore (IN); Srinivasu Godavari, Bangalore (IN); Thara Subramoni, Bangalore (IN); Harika Maddineni, Bangalore (IN); Lawrence Joseph, Bangalore (IN); Anuj Kumar Garg, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 387 days.

(21) Appl. No.: 13/981,558

(22) PCT Filed: Jan. 26, 2011

(86) PCT No.: PCT/US2011/022496
§ 371 (c)(1),
(2), (4) Date: Jul. 24, 2013

(87) PCT Pub. No.: WO2012/102710
PCT Pub. Date: Aug. 2, 2012

(65) Prior Publication Data
US 2013/0304861 A1    Nov. 14, 2013

(51) Int. Cl.
*G06F 15/16* (2006.01)
*H04L 29/08* (2006.01)
(Continued)

(52) U.S. Cl.
CPC .......... *H04L 67/10* (2013.01); *G06Q 10/103* (2013.01); *H04N 1/00204* (2013.01)

(58) Field of Classification Search
CPC ............... G06Q 10/06; G06Q 10/0633; G06F 17/30011; G06F 17/30707; G06F 21/606
See application file for complete search history.

(56) References Cited

U.S. PATENT DOCUMENTS

| 5,860,066 A | 1/1999 | Rouse |
| 7,623,741 B2 | 11/2009 | Simpson et al. |

(Continued)

FOREIGN PATENT DOCUMENTS

| CN | 101044498 | 9/2007 |
| CN | 101582922 | 11/2009 |
| EP | 2216979 A1 | 8/2010 |
| KR | 100673198 | 1/2007 |
| KR | 100710568 | 4/2007 |
| WO | WO-2005098597 A2 | 10/2005 |

OTHER PUBLICATIONS

Alex Williams, "Fujitsu and Mindtouch: Pushing documents from the scanner to a web oriented world," Feb. 10, 2010. <http://readwrite.com/2010/02/10/new-blogs-mean-what#awesm=-oc3T5wRimak5Ve>.

(Continued)

*Primary Examiner* — Umar Cheema
*Assistant Examiner* — Gregory P Tolchinsky
(74) *Attorney, Agent, or Firm* — HP Inc. Patent Department

(57) ABSTRACT

A method (200) and a computer readable medium for implementing a document workflow (16) are provided. The method includes receiving a document file (18) from a device (12) via a device application program interface (API) (24). The device (12) can be connected to a network (14). The document file (18) can include information content (20). The method also includes image-processing the document file (18) via a document-processing API (26) to extract the information content (20) from the document file (18). The method further includes invoking document services (28) via the document-processing API (26) to provide the extracted information content (20) to a service application (22) on the network (14).

13 Claims, 4 Drawing Sheets

(51) Int. Cl.
*G06Q 10/10* (2012.01)
*H04N 1/00* (2006.01)

(56) References Cited

U.S. PATENT DOCUMENTS

| | | | |
|---|---|---|---|
| 7,653,185 B2 | 1/2010 | Rebert et al. | |
| 7,792,871 B1* | 9/2010 | Baltazar et al. | 707/802 |
| 9,176,694 B2* | 11/2015 | Martin | G06F 3/1207 |
| 2002/0161746 A1 | 10/2002 | Murakami et al. | |
| 2003/0088828 A1 | 5/2003 | Ackaret | |
| 2004/0172602 A1* | 9/2004 | Iida et al. | 715/530 |
| 2004/0205376 A1 | 10/2004 | Iida | |
| 2008/0075964 A1 | 3/2008 | Burdick et al. | |
| 2008/0077465 A1* | 3/2008 | Schimpf et al. | 705/8 |
| 2008/0079985 A1 | 4/2008 | Ferlitsch | |
| 2008/0144076 A1 | 6/2008 | Boliek et al. | |
| 2008/0144103 A1 | 6/2008 | Kishimoto | |
| 2008/0144881 A1 | 6/2008 | Fortune et al. | |
| 2008/0235241 A1 | 9/2008 | Hattori et al. | |
| 2009/0265605 A1 | 10/2009 | Kaneshiro | |
| 2009/0276493 A1 | 11/2009 | Hikawa et al. | |
| 2009/0327945 A1 | 12/2009 | Tomizawa | |
| 2010/0005136 A1* | 1/2010 | Ferlitsch | G06F 17/30876 709/203 |
| 2010/0091313 A1 | 4/2010 | Kitada et al. | |
| 2010/0150424 A1 | 6/2010 | Nepomniachtchi et al. | |
| 2010/0231949 A1 | 9/2010 | Mori | |
| 2014/0029751 A1* | 1/2014 | Swineford et al. | 380/279 |

OTHER PUBLICATIONS

Hewlett-Packard Development Company, L.P, "Smart Document Scan Software 2.7," Apr. 2010.
Integrating Paper Documents Into Digital Workflows. 2008. eCopy, Inc. Oct. 2008. P/N ECOM-0176.
International Searching Authority; The International Search Report and the Written Opinion, Sep. 29, 2011, 9 Pages.
Anonymous: "Application programming interface", Wikipedia, the free encyclopedia, Dec. 27, 2010.
European Patent Office. Supplementary Partial European Search Report. Application No. Ep11857075. Mail date Oct. 6, 2015.
Bizcardreader, Business and Insurance Card Scanner, Welcome to BizCardReader, The Leader in Business Card Scanner and Reader Solutions dated on or before Dec. 30, 2010 (1 page).
DYMO CardScan dated on or before Jan. 1, 2011 (1 page).
HP, Fact Sheet, HP Imaging and Printing Open Extensibility Platform dated Aug. 2007 (2 pages).
HP, HP Digital Sending Software Specifications dated on or before May 21, 2010 (1 page).
ITWeb Smart Computing, HP expands breadth of Internet printing solutions to millions of installed HP printers, Feb. 16, 1999 (4 pages).
Microsoft Corp. and Hewlett-Packard Co., Microsoft and HP Submit Simple Web Printing Proposal to IETF Working Group, wwvv.pwg.org/pp/releases/970523, 1997 (1 page).

* cited by examiner

DOCUMENT WORKFLOW ARCHITECTURE

CROSS-REFERENCE TO RELATED APPLICATION

This application is a national stage application under 35 U.S.C. §371 of PCT/US2011/22496 filed Jan. 26, 2011.

BACKGROUND

As computer systems become more advanced, the interaction between different types of data and network-based applications becomes more involved. As an example, many businesses and personal computer users have begun to automate processes using a computer that have typically been implemented manually on paper. Many of these automated processes are implemented on network-based service applications that require a user to log-in and to enter data into the network-based service application. Sometimes, the information that is to be entered is available on a paper document, such that the user can enter the information to the network-based service manually or can scan the paper document and upload the scanned document to a website.

DETAILED DESCRIPTION

Figure 1:
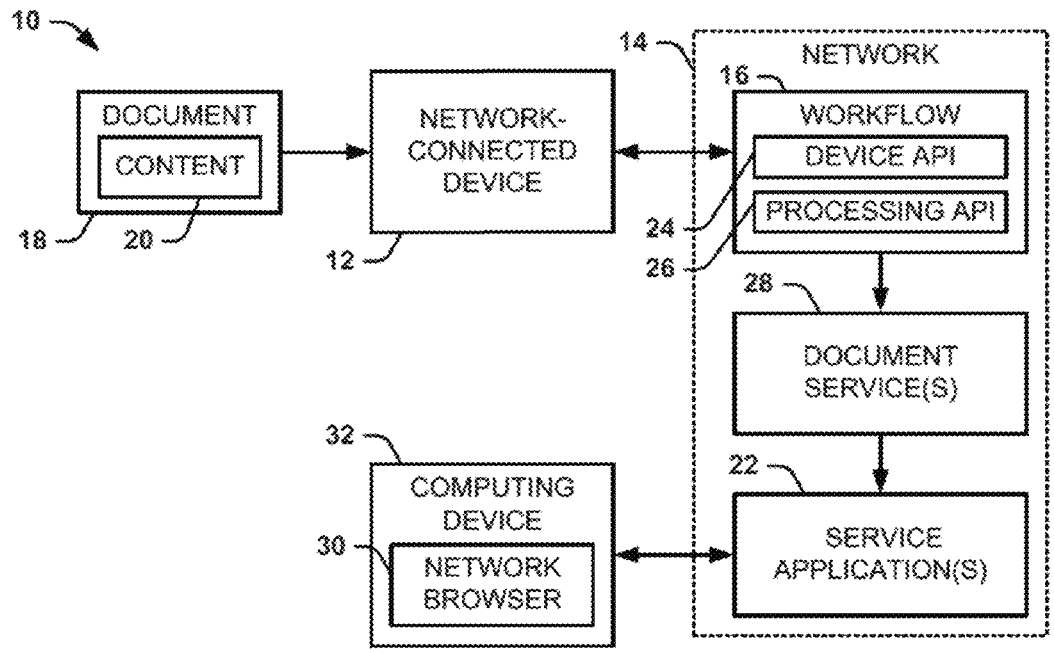
FIG. 1 illustrates an example of a document workflow architecture.

FIG. 1 illustrates an example of a document workflow architecture 10. The document workflow architecture 10 includes a network-connected device 12, such as a scanner, photocopier, printer, digital camera, or all-in-one (AIO) device. In the example of FIG. 1, the network-connected device 12 is coupled to a network 14. The network 14 can be a wide area network (WAN), such as the Internet, a local area network (LAN), or a cloud-based computing environment. For example, the network 14 can be a cloud platform that can support web-connected devices that include an interface, including the network-connected device 12, to allow these devices to print without the need for a computer (e.g., personal computer or other computer system). Such printing is referred to as Simple Internet Printing (SIP). The document workflow architecture 10 can expand upon such a platform by being implemented to provide automated uploading of documents or scanned document files to a document workflow 16 via the network-connected device 12. The document workflow 16 can be implemented independently of a computer, personal computer (PC) or otherwise, which can implement the document workflow 16 using a network browser.

In the example of FIG. 1, a document 18 can be provided to the network-connected device 12. The document 18 includes information content 20 that can include any of a variety of forms of data. As an example, the document 18 can be a business card, an invoice, a map, a photograph, a handwritten note (e.g., a napkin with handwriting on it), or any type of document that includes some form of discernable information. The information content 20 can be any information that may be included in the document 18, such as a person's name, an address, a phone number, an image of a person on a photograph, a corporate logo, handwritten text, dollar amounts, or any other type of information recorded on the document 18. For instance, the document 18 can be a physical hardcopy document, and the network-connected device 12 can be configured to scan the document 18 to generate a corresponding document file (e.g., a bitmap image of the document). Alternatively, the document 18 be provided as an image file (e.g., a digital photograph, an output from an application running on another network-coupled device), which can be provided to the network-connected device 12 via the network 14. For example, the document 18 can be streamed or emailed to the network-connected device 12 that is configured as a printer. As further described herein, the document 18 can refer to a document file that is a soft copy (e.g., an encoded representation) of the document.

In the example of FIG. 1 and as otherwise described herein, a user can implement a document workflow 16 from the network-connected device 12, such as via a user interface (not shown) on the network-connected device 12. Thus, the user can activate the document workflow 16 via the network-connected device 12 to process on the document, residing on the network-connected device 12, in a predetermined manner. The document workflow 16 can thus be implemented to provide the information content 20 directly from the network-connected device 12 to one or more service applications 22 residing on the network 14, such as in response to being scanned by or being sent to the network-connected device 12. As an example, the service application(s) 22 can include a variety of services implemented via one or more websites on the Internet that provide a service by executing one or more actions based on information provided by the user to the website. For instance, the service application(s) 22 can correspond to social networking services, personal webpages or other user-accessible services. The service application(s) 22 can be programmed to automatically execute one or more actions in response to the information content 20 being provided to the service application(s) 22 via the document workflow 16.

Implementation of the document workflow 16 can be performed based on a set of application programming interfaces (APIs). In the example of FIG. 1, the APIs include a device API 24 and a document-processing API 26. The device API 24 can be programmed as a device interface API with respect to the network-connected device 12 and one or more document services 28. The device API 24 can access a core set of device functionality as to generate the document file in a predetermined format and resolution, which can be defined according to processing requirements for a given document workflow.

The document-processing API 26 can be programmed to coordinate extraction of the information content 20 from the document 18, such that the information content 20 can be provided as inputs to the appropriate service application(s) 22. For instance, the document-processing API 26 can provide access to a core set of image processing functions and methods relative to the document file that is retrieved from the network-connected device 12. The document-processing API 26 can operate to obtain and convert the information content 20 to a form that is usable by the respective service application(s) 22 for executing actions based on the information content 20.

To provide the information content 20 to the service application(s) 22, the document-processing API 26 can also invoke the document service(s) 28. The document service(s) 28 can thus automatically provide the information content 20 to the service application(s) 22 as inputs. Thus, the document service(s) 28 provide interaction between the network-connected device 12 and the service application(s) 22 via the APIs 24 and 26, such that the document workflow 16 can input (e.g., post) selected information content 20 to the service application(s) 22 in a usable manner for the service application(s) 22 to execute one or more user-actions relative to the extracted information content 20. The particular actions performed can be user-defined. Therefore, the document workflow 16 can be implemented automatically from the network-connected device 12 to perform steps that normally require a user to use a network browser 30 via a computing device 32 to access the service application(s) 22.

As an example, a typical manner of implementing a document workflow could include the user manually scanning the document 18, uploading the document 18 onto the computing device 32, accessing the service application(s) 22 via the network browser 30, and publishing the document 18 or the information content 20 from the document 18 onto the service application(s) 22. Instead, as described herein, the user could simply provide the document 18 to the network-connected device 12, via scanning, streaming, or emailing, and can activate the document workflow 16 via a user interface on the network-connected device 12 to automatically implement the functionality of the service application(s) 22 with respect to the information content 20. It is to be understood that the activation of the document workflow 16 can also be performed from other network-connected devices, such as the computing device 32 or a wireless communication device (e.g., cellular telephone, gaming device or the like).

Figure 2:
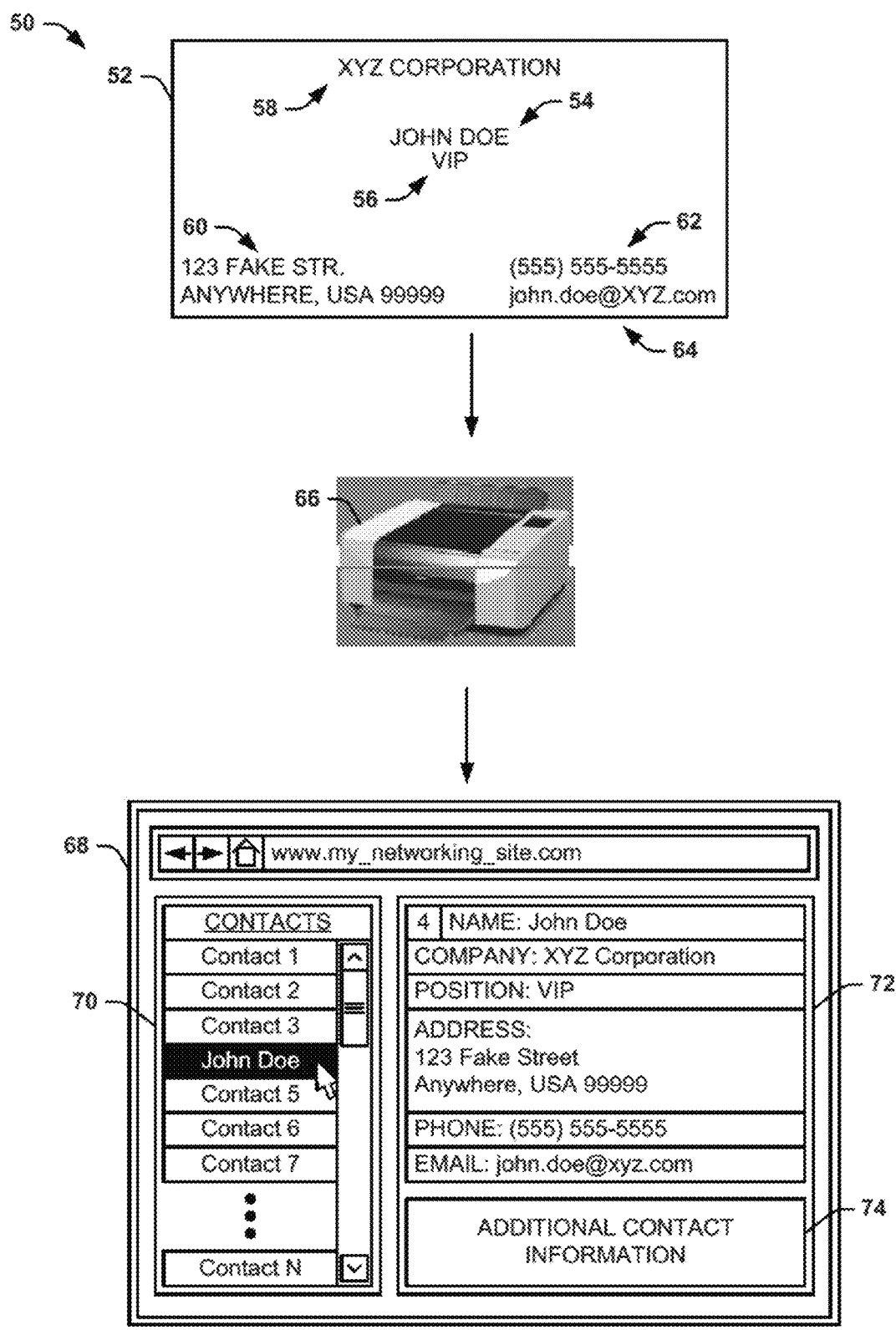
FIG. 2 illustrates an example of a document workflow application.

FIG. 2 illustrates an example of a document workflow 50. The document workflow 50 can correspond to the document workflow 16 that is implemented within the document workflow architecture 10 in the example of FIG. 1. Therefore, reference is to be made to the example of FIG. 1 in the following description of the example of FIG. 2.

In the example of FIG. 2, the document workflow 50 demonstrates a user updating his or her contacts on a networking website based on a business card 52. The business card 52 demonstrates the name of the new contact at 54, demonstrated as "John Doe", having the position of "VIP" at a place of employment, the "XYZ Corporation", as demonstrated at 56 and 58, respectively. The business card 52 also includes contact information for John Doe, in the form of an address at 60, a phone number 62, and an email address 64. The business card 52 can correspond to the document 18 in the example of FIG. 1 that can be implemented in a document workflow 16. Thus, each of the characteristics of the business card 52, including the name 54, the position 56, the business 58, the address 60, the phone number 62, and the email address 64 can correspond to information content 20 of the document 18. Such characteristics can exist at various locations depending on the layout of the given business card 52.

A user can provide the business card 52 to a network-connected device 66. As one example, the network-connected device 66 can be or can include a document scanner, such that the user can scan the business card 52 to generate a document file corresponding to the business card 52. As another example, the network-connected device 66 can be or can include a printer, such that the user or an application can email or stream a document file of the business card 52 to the printer. The user can activate the document workflow 16 from a user interface on the network-connected device 66 for processing the business card. As an example, the user can program the user interface of the network-connected device 66 to access a "business card" or "add to contacts" workflow 16, which can be predefined for the user such as described herein. The user interface can activate the document workflow 16 (e.g., via the user interface element) for automatically obtaining document information from the business card and posting it to a desired service application(s) for the user. Alternatively, the user can enter information for accessing the document workflow 16, such as username, password information, and enter login data (e.g., user ID and password) for accessing a desired service application to which the business card 52 is to be provided. In the example of FIG. 2, the service application can be a networking website, such that the business card 52 can be added to a list of contacts.

In response to activating the document workflow 16, the device API 24 can negotiate the user provided information to the document service(s) 28 through the network 14, and can provide the document file of the business card 52 to the document-processing API 26. The document-processing API 26 can thus operate to extract the information content 20 from the business card 52. As an example, the document-processing API 26 can access third party software that is capable of extracting the specific text components of the business card 52 and saving the extracted components as text, strings via the document service(s) 28. In the example of FIG. 2, the document-processing API can thus extract the name 54, the position 56, the business 58, the address 60, the phone number 62, and the email address 64 as separate components of the information content 20 of the business card 52. Thus, functionality that can be performed locally on the user's computer can be pushed to the network and occur automatically via the document-processing. API 26 without knowledge of the user.

The document service(s) 28 can provide the extracted information content 20 to the networking website that corresponds to the service application 20. Thus, the document workflow 16 can be implemented to provide the components of the information content 20 to respective inputs of the networking website, such that the document workflow 16 can update a contacts list with relevant information associated with the contact "John Doe" in the networking website.

In the example of FIG. 2, the document workflow application 50 demonstrates a graphical user interface (GUI) 68 that corresponds to the networking website, as accessible by the user via a network browser, after implementation of the document workflow 16. The GUI 68 includes a list of contacts 70. In response to activating the document workflow 16, the contact list 70 is automatically populated with the new contact "John Doe" based on the name 54 being extracted from the business card 52 and provided as an input to the networking website. For example, the document-processing API 26 can coordinate with one or more of the document service(s) 28 to recognize that the portion of the business card 52 corresponding to the name 54 is the name of the new contact, and should thus be provided as an input contact name to the networking website. User login information for the user can be stored in a secure repository, which can be accessed by the document services 28 via the information provided from the document-processing API 26 in response to user-activation of the given workflow via the GUI 68.

In addition, the GUI 68 includes a details section 72 that provides details about a specific contact that is selected from the contact list 70. In the example of FIG. 2, the contact "John Doe" is demonstrated as having been selected from the contact list 70. Thus, the details section 72 demonstrates details regarding the contact "John Doe", including the contact's name, the company name, as well as the contact's position, address, phone number, and email address. Similar to as described above, in response to activating the document workflow 16, the details section 72 is automatically populated with the position 56, the business 58, the address 60, the phone number 62, and the email address 64 that are extracted from the business card 52 and provided as inputs, which are mapped to corresponding fields, of the networking website. The details section 72 also includes a section for additional contact information 74. The document services can organize and tag each unit of extracted information content in a desired format (e.g., an XML document according to a predefined schema), and provide such data to the networking website on behalf of the user. The additional contact information 74 can correspond to additional information that is extracted from the business card 52 by the document-processing API 26, or can correspond to notes regarding the contact that can be entered by the user into the network-connected device 66 at the time that the document workflow 16 is activated or at a later time, such as via a network browser.

Therefore, the document workflow 16 can be implemented to update the user's contacts with information about "John Doe" merely by providing the business card 52 to the network-connected device 66 and activating the document workflow 16 from the network-connected device 66 without having to manually enter any of the information about John Doe in the networking website via a network browser. Upon implementing the document workflow 16, the user can subsequently log-in to the networking website and access the information about the contact "John Doe" using the network browser. The document workflow 16 can also be implemented to concurrently provide the information content 20 of the business card 52 to a variety of additional service applications 22 on the network 14, such as additional networking websites or search engine queries, and can further be programmed to provide additional actions based on the implementation of the document workflow 16. As an example, upon providing the business card 52 to the network-connected device 66 and implementing the document workflow 16, the document workflow 16 can provide the name "John Doe" to a search engine and can return the results as a printout on a printer (e.g., the network-connected device 66).

It is to be understood that the document workflow application 50 in the example of FIG. 2 is but one example of a document workflow application. As another example, the document 18 could be an invoice, such that a document workflow 16 could be implemented to automatically pay bills. As another example, the document 18 could include employer and/or service provided tax forms, such that the user could implement a document workflow 16 to automatically provide tax information to an online tax preparation service. As yet another example, the document 18 could be a map, or could have an address on it, such that a document workflow 16 could automatically fetch driving directions to or from the location using an online direction service, or could fetch information about the location using an online almanac or travel service. As a further example, the user could scan a crumpled, marked-up, or otherwise damaged document 18 on the network-connected device 66 and activate a document workflow 16 to implement document cleanup and skew correction services, such that the network-connected device 66 prints a clean printout of the document 18. As yet a further example, the document 18 could include handwritten notes, such that a document workflow 16 could have the handwritten notes transformed into typed print and provided to a website or printed back out on the network-connected device 66. Accordingly, the document workflow 16 can be implemented to perform any of a variety of actions using the document 18 via the service application(s) 22.

Figure 3:
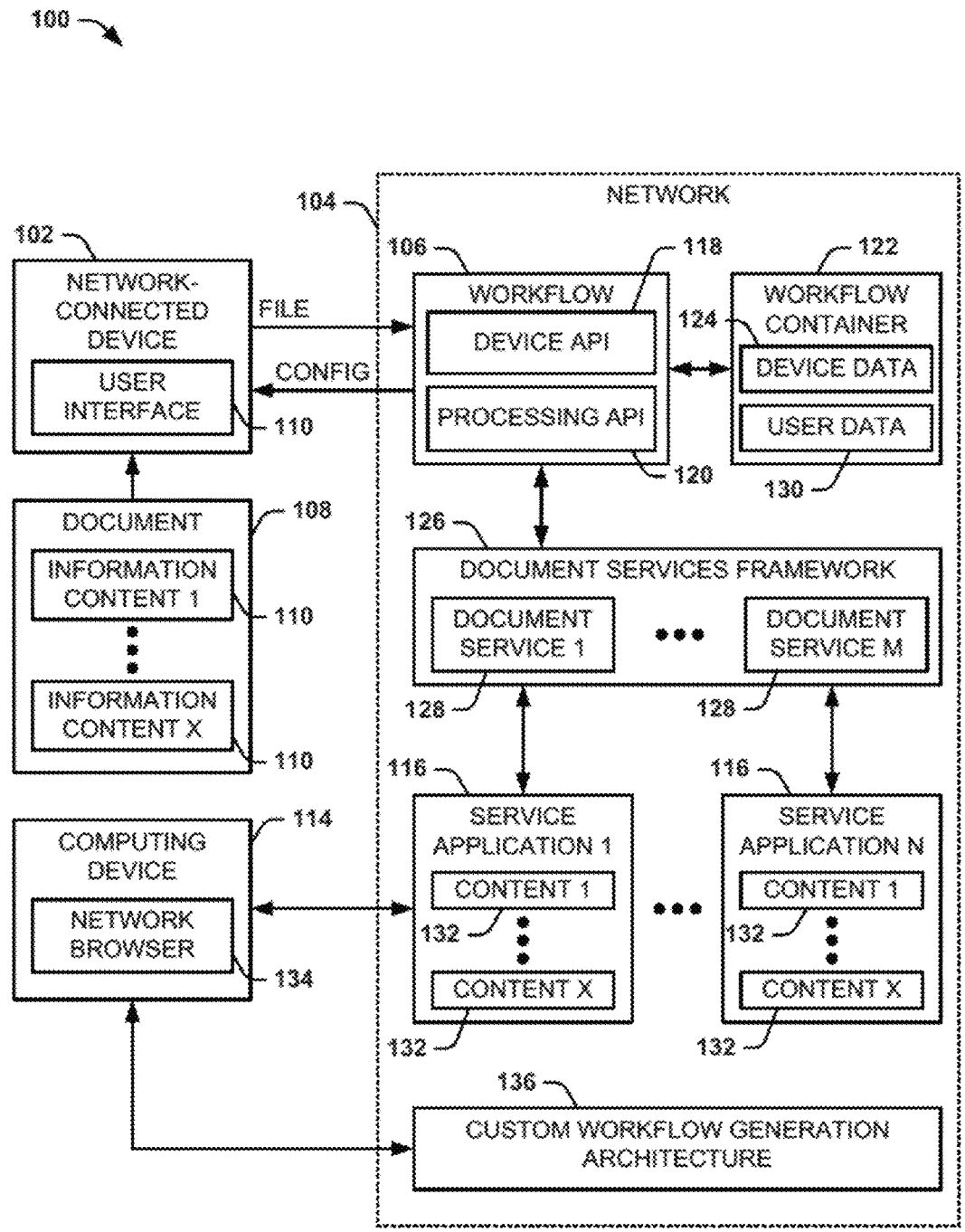
FIG. 3 illustrates another example of a document workflow architecture.

FIG. 3 illustrates another example of a document workflow architecture 100. The document workflow architecture 10 includes a network-connected device 102, such as a scanner, photocopier, printer, digital camera, or all-in-one (AIO) device, coupled to a network 104. The document workflow architecture 100 can be implemented to provide automated uploading of paper documents or scanned document files to a document workflow 106 via the network-connected device 12, similar to as described above in the example of FIG. 1. Thus, the document workflow 106 can be implemented independently of a computer, personal computer (PC) or otherwise, that can implement the document workflow 106 using a network browser.

In the example of FIG. 3, a document 108 can be provided to the network-connected device 102. The document 108 includes a set of information content 110 having a plurality of components numbered 1 through X, where X is a positive integer. The information content 110 that can include any of a variety of forms of data that can be separate and distinct from each other, such as the different components of the business card 52 in the example of FIG. 2. The document 108 can be a physical hardcopy document, such that the network-connected device 102 scans the document 108 to generate a document file. Alternatively, the document 108 can be a document file, such as provided to the network-connected device 102 via the network 104 or a separate network. Thus, the document file is accessible by the network 104, demonstrated in the example of FIG. 3 as FILE.

Similar to as described above in the examples of FIGS. 1 and 2, a user can implement the document workflow 106 via a user interface 112 of the network-connected device 102. As an example, the user interface 112 can physically reside on the network-connected device 102 or can be a software interface on a computing device 114, such as coupled to the network-connected device 102 via a LAN or WAN. Thus, the user can activate the document workflow 106 on the network-connected device 102 via the user interface 112. The document workflow 106 can be implemented to provide the components of the information content 110 directly from the network-connected device 102 to one or more of a plurality N of service application services 116 residing on the network 104, where N is a positive integer. For example, the service applications 116 can include a variety of websites on the Internet that provide a service by executing one or more actions based on information provided by the user to the website.

To implement the document workflow 106, the network 104 includes a device API 118 and a document-processing API 120. The device API 118 can be programmed as a device interface API with respect to the network-connected device 102. As a result, the document workflow 106 can be implemented without a need for understanding or using the lower level protocols utilized by the network-connected device 102. For example, upon the document workflow 106 being activated, the device API 118 can be configured to access a workflow container 122 residing on the network 104.

In the example of FIG. 3, the workflow container 122 includes a set of device data 124 associated with a given document workflow. As an example, the workflow container 122 can be configured to store sets of device data 124 for each of a plurality of document workflows for each of a plurality of different network-connected devices. Thus, the device API 118 can enable access to a document services framework 126 that includes a plurality M of document services 128 via the network-connected device 102, where M is a positive integer. As an example, the network security/API-access functionality 120 can set the document services framework 126 as a callback to an asynchronous scan request by the network-connected device 102. The device API 118 can thus provide the set of device data 124 corresponding to the specific document workflow 106 to the network-connected device 102 to configure the network-connected device 102 with settings that may be required by the document-processing API 120 and/or the one or more of document services 128 in the document services framework 126.

In the example of FIG. 3, the set of device data 124 is provided to the network-connected device 102 via a signal CONFIG. As an example, the set of device data 124 can specify scanning requirements of the network-connected device 102 configured as a scanning device based on a simple call to the device API 118, such as a requirement by a document service 128 to scan the document 108 with a predetermined minimum resolution (e.g., 600 dots per inch (dpi)).

The device API 118 can also implement network security functionality that can provide security features for the user to access the service applications 116. In the example of FIG. 3, the workflow container 122 includes a set of user data 130 associated with a given document workflow. As an example, the user data 130 can be implemented as repository configured to store sets of user data for each of a plurality of users for each of a plurality of different document workflows. Each of the sets of user data 130 can correspond to unique information associated with the specific user that implements the document workflow, such including as a username and password for one or more web services. For instance, a user can enter such information as part of a workflow configuration session (e.g., a secure session) for each service application(s) that is to be implemented in a given workflow. In this way, the document workflow 106 can securely access the set of user data 130 to the respective service applications 116 that are to be accessed for a given document workflow. Such security features can be implemented, for example, by leveraging a Cloud print functionality (not shown) and extending a payload used over an Extensible Messaging and Presence Protocol (XMPP) for signaling and using Hypertext Transfer Protocol Secure (HTTPS) for secure uploading of the document file corresponding to the document 108.

As another example, at least a portion of the device API 118 can reside on the network-connected device 102 itself. For instance, the network-connected device 102 can be configured to select the document workflow 106 from a plurality of predetermined document workflows and automatically activate the document workflow 106 based on contents in the document 108. In this example, the network-connected device 102 can be programmed to recognize (e.g., via optical character recognition algorithm) and differentiate at least some of the information content 110 of the document file 106 automatically. As an example, the network-connected device 102 could be programmed to automatically recognize a business card (e.g., the business card 52 in the example of FIG. 2), such that the network-connected device 102 can automatically identify that the document 108 is a business card, such as based on the size of the document 108 and/or location of the information content 110 therein. In response, the network-connected device 102 could be configured to automatically select a "business card document workflow" from a list of document workflows. Thus, the selected workflow can in turn employ the device API 118 to set the appropriate scan settings of the network-connected device 102, identify relevant portions of the business card 52 to the document-processing API 120, and/or access resource locators on the network 104 corresponding to the respective service applications 116 corresponding to the document workflow 106.

The document-processing API 120 includes an interface for invoking content extraction functionality 124 to extract the components of the information content 110 from the document 108. The content extraction functionality 124 can support one or more of the document services 128 corresponding to a variety of image-processing algorithms, such as handwriting interpretation, text extraction, facial recognition, or a variety of other algorithms that can extract the information content 110 from the document 108. The document-processing API 120 can thus allow access to document services 128 that are third party processing engines, such as capable of performing optical character recognition (OCR) for extracting the information content 110. Thus, the document-processing API 120 can be utilized to convert the information content 110 to a form that is usable by the respective service applications 116 for executing actions based on the information content 110. Thus, the workflow 106, via its APIs 118 and 120, can provide extracted components of the information content 110 as inputs to the appropriate service applications 116, along with requisite security data from the user data 130.

The document services framework 126 can be programmed to allow a plug-and-play environment for a variety of document services 128 that can implement document-processing. As an example, document workflow creators can develop a variety of workflow and document-processing APIs, such as the workflow and document-processing APIs 118 and 120, that can work with the existing document services framework 126. In addition, as described above, the document services framework 126 can coordinate with the device API 118 to enable secured access between the network-connected device 102 and the service applications 116, such as by seamlessly supporting secured authorization and authentication between the network-connected device 102 and the service applications 116. Furthermore, the document services framework 126 can allow a variety of additional core services to support specific service applications 116, such as orchestration, discovery, deployment, and/or coordination.

As a result of the interaction of the workflow 106 and document-processing APIs 116 and 120 with the network-connected device 102 and the document services framework 126, the document workflow 106 can thus input the information content 110 to the service applications 116 in a usable manner for the service applications 116 for executing one or more actions based on the components of the information content 110. As part of a given document workflow, the processing API can invoke one or more of the document services 128 to provide the extracted information content 110 on behalf of a given user securely to one or more of the service applications 116.

In the example of FIG. 3, the components of the information content 110 of the document 108 are demonstrated as being provided to each of the service applications 116 as X components of content 132. Thus, the components of the information content 110 can be provided to one or more of the service applications 116 as the components of content 132. Therefore, upon implementing the document workflow 106, the content 132 can be available to a user such as by accessing one or more of the service applications 116 via a network browser 134 on the computing device 114. As another example, the document workflow 106 can implement one or more of the service applications 116 via the content 132 to implement an action using the network-connected device 102, such as printing out a result based on the content 132, as described herein. That is, a given workflow 106 can employ the device API 118 to retrieve content from the network-connected device 102, to send content to the network-connected device to be processed thereby (e.g., printed) or both retrieve content from and send content (which may be the same or different content) back to the device for processing. In this way, the network-connected device 102 can be utilized by the workflow 106 via the API 118 as one of the service applications 116 in the architecture 100.

It is to be understood that, while the example of FIG. 3 demonstrates X components of content 128 in each of the service applications 116, not all of the components of the information content 110 need be provided to each of the service applications 116, or that the components of the information content 110 need be provided to more than one service application 116. As an example, some portions of the information content 110 can be provided to one service application 116, while other portions of the information content 110 can be provided to other service applications 116.

The above described implementation of the document workflows assumes pre-existing architecture resident on the network 104 with respect to the workflow and document-processing APIs 118 and 120 and the respective document services 126 of the service applications 116. However, a user may desire to implement a custom document workflow that has not yet been developed. Therefore, the network 104 includes a custom workflow generation architecture 136 that is configured to develop document workflows that are generated based on user action, such as by manually implementing the steps of the desired document workflow via the network-connected device 102 and the network browser 134.

Figure 4:
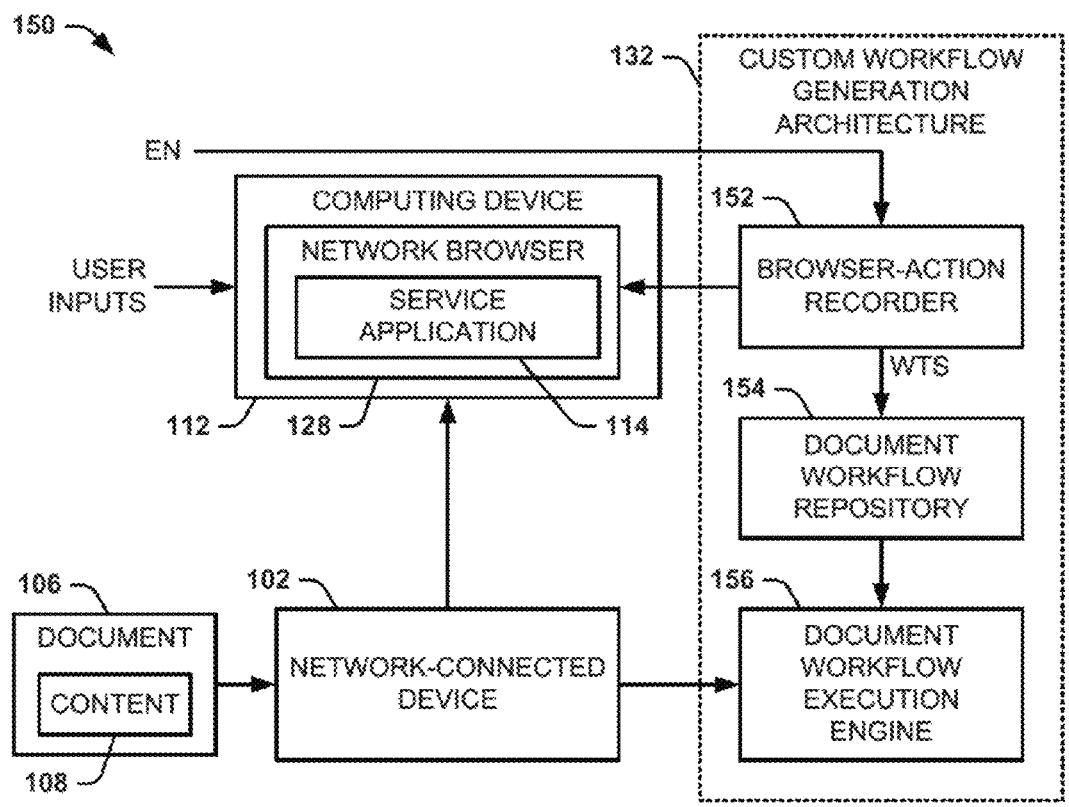
FIG. 4 illustrates an example of a document workflow generation system.

FIG. 4 illustrates an example of a document workflow generation system 150. The document workflow generation system 150 can operate in the document workflow architecture 100 in the example of FIG. 3. Therefore, reference can be made to the document workflow architecture 100 in the example of FIG. 3 for additional context in the following description of the example of FIG. 4.

The document workflow generation system 150 includes a custom document workflow generation architecture 136 that is configured to generate an automated document workflow, such as described herein. The user can generate the custom document workflow by recording a set of manually implemented steps corresponding to the desired document workflow via user inputs. For instance, the user can provide the document 108 to the network-connected device 102 in the manner described herein (i.e., by scanning or streaming) to generate the document file. The document file can then be provided to the computing device 114, via the signal FILE, such that the user can manually provide the document file to the respective service application 116 manually via the network browser 28. As an example, the user can upload the document file to the service application 116, or can manually enter the information content 110 of the document 108 directly to the service application 116. It is thus to be understood that, in manually implementing the steps of the desired document workflow, the generation of the document file corresponding to the document 108 may be unnecessary.

Prior to performing the manual steps of the desired document workflow, the user can initiate a browser-action recorder 152 service of the workflow generation architecture on the network 104, demonstrated in the example of FIG. 4 as being performed via an enable signal EN. The browser-action recorder 152 can thus record the manual steps performed by the user in implementing the desired document workflow on the network browser 134. Thus, the network interactions performed via the user inputs can be recorded, such as the resource locator(s) of the service application 116 and the manner and format in which the user inputs the information content 110 into the service application 116. The browser-action recorder 152 can thus capture the semantics of the manual steps provided by the user to analyze them and generate a workflow template script (WTS).

The WTS can be provided to a document workflow repository 154 resident on the network 104. The document workflow repository 154 can be configured as a storage with which the WTS can be registered with and stored in a repository on the network. Thus, the document workflow repository 154 can generate a resource locator, such as a Uniform Resource Locator (URL). The resource locator can thus be provided to a document workflow execution engine 156 on the network 104 that can be accessible via the unique resource locator for subsequent execution of the document workflow. For example, to subsequently implement the document workflow in the automated manner described herein, the user (e.g., via a device or application) can access the document workflow execution engine via the unique resource locator, such as using the network-connected device 102, to access the registered WTS. Thus, the document workflow execution engine 156 can execute the document workflow steps that are provided on the WTS for the execution of the document workflow.

As an example, the document workflow execution engine 156 can access the document services framework 126 to access the respective service application 116 and/or necessary third party image-processing services based on the steps recorded in the WTS for implementation of the document workflow. Accordingly, the user can generate a custom document workflow without the need for or knowledge necessary for generating the associated workflow and document-processing APIs 114 and 116.

As another example, the document workflow execution engine 156 can be configured to invoke existing the document services framework 126 and/or existing APIs, such as based on the user specifying the information on a given document file with which the desired document workflow can be associated. For example, the user can scan a business card, and using a PC or other network device, can specify locations of the specific information content 110 on the image of the business card with which the user wishes to invoke the document services framework 126. Thus, the user can invoke an existing document-processing API 120 via a PC, either manually or automatically, which implements the document services framework 126 to update a contact list on a networking website, such as similar to the example of FIG. 2, based on specifying the location of the information content 110 on the business card. One or more of the steps to implement the desired document workflow, including specifying the location of the information content 110, can be recorded by the browser-action recorder 152, such that the document workflow can be created by the custom workflow generation architecture 132. Accordingly, custom workflows can be generated without the need for programming by a user.

Figure 5:
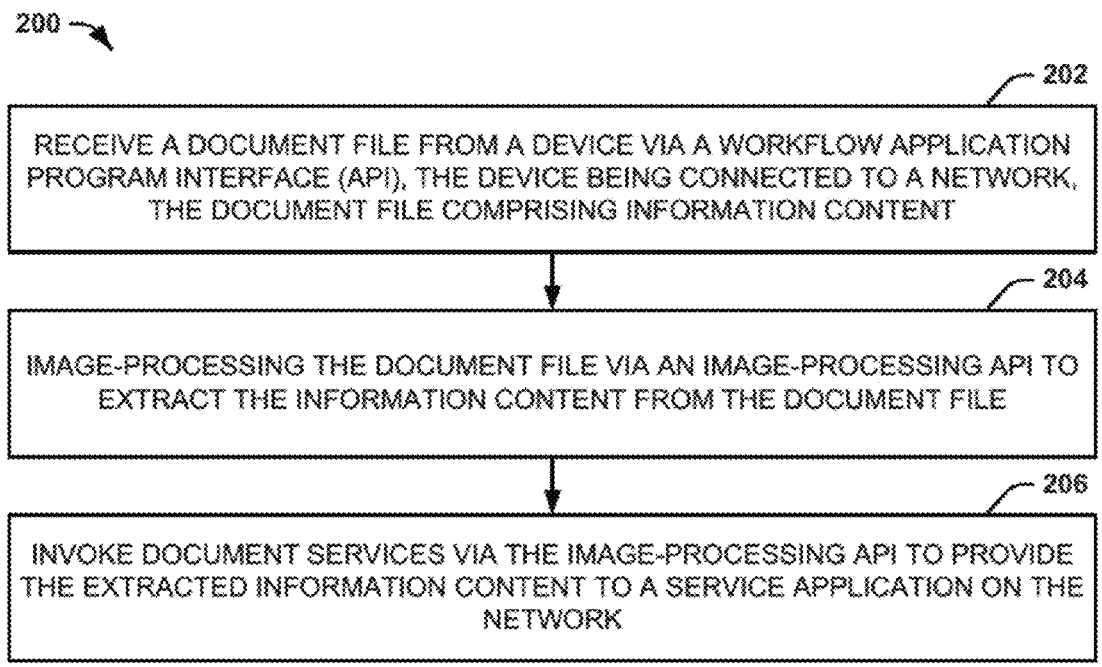
FIG. 5 illustrates an example of a method for implementing a document workflow.

In view of the foregoing structural and functional features described above, an example method will be better appreciated with reference to FIG. 5. While, for purposes of simplicity of explanation, the method of FIG. 5 is shown and described as executing serially, it is to be understood and appreciated that the method is not limited by the illustrated order, as parts of the method could occur in different orders and/or concurrently from that shown and described herein.

FIG. 5 illustrates an example of a method 200 for implementing a document workflow. At 202, a document file is received from a device (e.g., the network-connected device 12 of FIG. 1) via a device API (e.g., the device API 24 of FIG. 1). As described herein, the device can be connected to a network and the document file can include information content. At 204, the document file is image-processed via a document-processing API (e.g., the processing API 26 of FIG. 1) to extract the information content from the document file. At 206, document services (e.g., the services 28 of FIG. 1) are invoked via the document-processing API to provide the extracted information content to a service application on the network.

What have been described above are examples. It is, of course, not possible to describe every conceivable combination of components or methodologies, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements.

What is claimed is:

1. A method comprising:
   receiving activation of a first workflow selected from a plurality of different workflows relating to scanning of documents, the selecting of the first workflow from the plurality of different workflows based on recognition of a type of document from different types of documents, the plurality of different workflows associated with respective plural different device data specifying different document scan settings of a document capture device;
   responsive to the activation of the first workflow:
      accessing first device data corresponding to the first workflow from the plural different device data,
      sending, by a device application programming interface (API) of a cloud platform, the first device data to the document capture device, the first device data to configure a document scan setting of the document capture device, and
      accessing, by the device API, a user setting corresponding to the first workflow;
   receiving, by the device API of the cloud platform, a document file from the document capture device that captured the document file according to the document scan setting configured by the first device data, the document file comprising information content;
   processing, by a document-processing API of the cloud platform, the document file to extract the information content from the document file;
   invoking a document service using the document-processing API to input the extracted information content to a website implementing a service application; and
   providing, by the device API to the service application, the user setting that includes information relating to a user that activated the first workflow.

2. The method of claim 1, wherein the activation of the first workflow is responsive to a selection made in a user interface on the document capture device.

3. The method of claim 1, further comprising:
   recording, by a browser, implementation of tasks of the first workflow; and
   generating the first workflow based on the recorded implementation of the tasks.

4. The method of claim 3, wherein generating the first workflow comprises:
   generating a script associated with the recorded implementation of the tasks;
   storing the script in a repository of the cloud platform; and
   assigning a resource locator for accessing the script in the repository.

5. The method of claim 4, further comprising activating the first workflow based on accessing the resource locator via the document capture device.

6. A document workflow system comprising:
   a cloud platform comprising a computer to:
      receive activation of a first workflow selected from a plurality of different workflows relating to scanning of documents, the selecting of the first workflow from the plurality of different workflows based on recognition of a type of document from different types of documents, the plurality of different workflows associated with respective plural different device data specifying different scan settings of a scanning device, and
      responsive to the activation of the first workflow, access first device data corresponding to the first workflow from the plural different device data;
   a device application program interface (API) hosted on the cloud platform comprising the computer to:
      provide the first device data over a network to a scanning device connected to the network, the first device data includes information of a scan setting of the scanning device and the first device data is to configure the scan setting of the scanning device that scans a physical document,
      invoke a workflow application on the network for accessing a document file from the scanning device, the document file comprising information content, and
      access a user setting corresponding to the first workflow;
   a document-processing API hosted on the cloud platform to invoke an image processing application for extracting the information content from the document file; and
   a document services framework hosted on the cloud platform to coordinate access of a service application on the network from the scanning device, the document services framework to provide the extracted information content to the service application, and
   the device API to provide, to the service application, the user setting that includes information relating to a user that activated the first workflow.

7. The document workflow system of claim 6, wherein the first workflow is accessible from the network via the scanning device using a resource locator, the resource locator identifying a registered script comprising recorded tasks corresponding to the first workflow, the recorded tasks being previously recorded on a network browser.

8. The document workflow system of claim 6, further comprising a workflow container to store a set of user data and the first device data corresponding to the first workflow and accessible by the document services framework, the document services framework to employ the set of user data for accessing the service application, the first device data being utilized for obtaining the document file from the scanning device according to requirements of the document services framework in response to activation of the first workflow.

9. The method of claim 1, wherein the document capture device is a scanner, and wherein sending the first device data to the scanner causes a configuration of the document scan setting of the scanner.

10. The method of claim 9, wherein the document scan setting of the scanner configured by the first device data comprises a resolution of a scan of a document to produce the document file, and wherein the plural different device data specify different scan resolutions of the scanner.

11. The method of claim 1, further comprising:
updating, by the service application, a list of contacts of a user based on the extracted information content.

12. The method of claim 3, wherein recording the implementation of the tasks comprises recording the implementation of manual tasks performed by a user.

13. The document workflow system of claim 6, wherein the scan setting of the scanning device configured by the first device data comprises a resolution of a scan of a document to produce the document file, and wherein the plural different device data specify different scan resolutions of the scanning device.

* * * * *